United States Patent [19]

Decker et al.

[11] 3,985,036

[45] Oct. 12, 1976

[54] OUTRIGGER AND MOUNTING MEANS FOR TRUCK WITH A CONVEYOR BOOM

[75] Inventors: Raymond E. Decker, Riverside; Evan Prichard, Newport Beach, both of Calif.

[73] Assignee: Challenge-Cook Bros., Incorporated, Los Angeles, Calif.

[22] Filed: Feb. 15, 1973

[21] Appl. No.: 332,602

[52] U.S. Cl. .................................... 74/96; 280/764; 254/86 R; 248/351; 212/145

[51] Int. Cl.[2] .......................................... F16H 21/44

[58] Field of Search ........................... 248/351, 352; 280/150.5; 212/145; 198/233; 254/86 R, 86 H; 214/138 R; 74/89.20, 96

[56] References Cited

UNITED STATES PATENTS

| | | | |
|---|---|---|---|
| 3,100,049 | 8/1963 | Garnett | 212/145 |
| 3,144,138 | 8/1964 | Brown et al. | 212/145 |
| 3,167,188 | 1/1965 | Burgess | 212/145 |
| 3,279,622 | 10/1966 | Person | 212/145 |
| 3,298,539 | 1/1967 | Sundstrom | 212/145 X |
| 3,337,063 | 8/1967 | Testore | 212/145 |
| 3,801,068 | 4/1972 | Kopas | 254/86 R |

FOREIGN PATENTS OR APPLICATIONS

| | | | |
|---|---|---|---|
| 67,996 | 10/1957 | France | 212/145 |
| 1,465,607 | 12/1966 | France | 212/145 |
| 1,680,137 | 1/1970 | Germany | 212/145 |
| 193,701 | 8/1967 | U.S.S.R. | 212/145 |

*Primary Examiner*—Robert J. Spar
*Assistant Examiner*—R. B. Johnson
*Attorney, Agent, or Firm*—Lyon & Lyon

[57] ABSTRACT

A support system for a boom mounted on a truck includes four outriggers mounted to the boom pedestal which can be folded against the pedestal or extended to provide a wide base for supporting the boom. Each outrigger has an inboard leg member pivotally mounted to the truck and driven by a hydraulic cylinder. An outboard leg member is pivotally mounted to the outer end of the inboard leg member and is caused to pivot relative to the inboard leg member at approximately twice the pivot rate thereof and in the opposite direction. The outriggers may be extended by a single operation of the hydraulic cylinder. The means for rotating the outboard leg member causes the outrigger not to drag along the ground until it is finally placed. Means are provided for preventing pivotal motion of the legs beyond predetermined positions.

3 Claims, 7 Drawing Figures

OUTRIGGER AND MOUNTING MEANS FOR TRUCK WITH A CONVEYOR BOOM

This invention relates to an outrigger support system for a truck mounted boom. More specifically, this invention is directed to an improved outrigger support assembly which is capable of extending to a support position or retracting to a folded traveling position.

Outrigger supports have been developed for stabilizing truck mounted booms which would otherwise tend to overturn the truck during operation. The present invention is put in the context of a concrete placement boom which requires such a support system. The outrigger support systems which have heretofore been employed have included fixed channels horizontally mounted about the truck. Extension members are slidably mounted in these channels and may be extended horizontally outward. Hydraulic cylinders mounted at the ends of these extension members extend downward so that the piston ends of the cylinders may be forced against the ground.

Certain disadvantages are associated with these sliding extension systems. The sliding fit of the extensions in the channels can be easily rendered inoperable by a slight bend in the extension members. Further, the hydraulic cylinders exposed at the ends of the extension members are vulnerable to damage. These hydraulic cylinders must also support bending forces as well as compression forces due to side loads imposed by the shifting of the truck and the boom. These bending forces can also easily damage a hydraulic cylinder.

Another disadvantage of the systems heretofore employed for supporting truck mounted booms is that a means separate from the depending hydraulic cylinders must be employed to extract the extension members from the channels. If this is not to be manually accomplished, a second set of hydraulic cylinders or other mechanical drive means must be employed. When the extensions are to be manually extended, the problem of binding of the sliding fit is compounded due to the strength limitations of the operator.

The present invention provides a novel system for supporting truck mounted booms which includes a plurality of outriggers pivotally jointed to extend and retract under the actuation of hydraulic cylinders. The system avoids the detrimental features of the systems heretofore employed and improves the ease with which the outrigger system may be deployed or retracted. The present device incorporates a single hydraulic cylinder with each of the outrigger assemblies. Each of these cylinders is mounted inboard and is pivotally attached to minimize bending loads. The outrigger assemblies do not rely on sliding fits for deployment; but rather rely on protected pivoted joints.

Accordingly, it is an object of the present invention to provide a truck boom support system having a plurality of outriggers driven by inboard actuating means. A single hydraulic cylinder may be provided for each outrigger which is attached to the pedestal mount of the truck. This inboard mounting of the actuation means provides protection for each hydraulic cylinder and allows it to be pivotally mounted to preclude the imposition of bending loads thereon.

A second object of the present invention is to allow the positioning of each of the outriggers in a single operation which may be accomplished from a boom control position at a distance from the support system. By employing the outrigger configuration of the present invention, which uses hydraulic cylinders to actuate the outriggers, a displaced control position may be conveniently provided through hydraulic valve means.

Another object of the present invention is to provide a jointed outrigger configuration which can be folded against the truck during transport and quickly deployed outward in a single operation to provide a rigid support. Each outrigger of the present invention includes two leg members pivotally joined. The innermost leg member is pivotally mounted on the truck and is driven directly by the inboard actuation means. The inboard leg member is designed to rotate from a vertical storage position to a deployed position angled downward from the truck toward the ground. The outboard leg member is designed to rotate from a vertically downward position folded against the inboard leg member in the storage position to a deployed position extending from the inboard leg member is a straight angle therewith.

A further object of the present invention is to provide a linkage system which constrains the leg members to simultaneously rotate from the storage position into the deployed position under the operation of the inboard actuating means. The two leg members are caused to unfold under the operation of the inboard actuating means by virtue of mechanical linkage which requires the outermost leg member to rotate relative to the inner leg member at a rate which is approximately twice the rate at which the inner member rotates relative to the truck. This linkage may be supplied by a cable fixed at one end to the truck body and at the outer end to the outermost leg member. This cable is caused to run over the two joints of the outrigger which have specific diameters that operate to control the rate of deployment of the outermost leg relative to the inner leg member.

Another object of the present invention is to provide a means for deploying each outrigger to an intermediate position when full deployment is impractical. A tension link may be incorporated between the outboard leg member and the inboard leg member to hold the outrigger in a semi-deployed position. A flexible portion in the linkage system allows each outrigger to partially deploy and then come to rest on the ground for support of the truck boom.

Thus, an improved support system for a truck mounted boom incorporating a number of outrigger members is provided which is actuated by a single inboard actuation means to go from a stowed position to a plurality of deployed positions for advantageously supporting a truck mounted boom. Further objects and advantages will become apparent from the description herein.

FIG. 2 is sectioned below the boom turret to illustrate the pedestal and actuation means.

Figure 1:
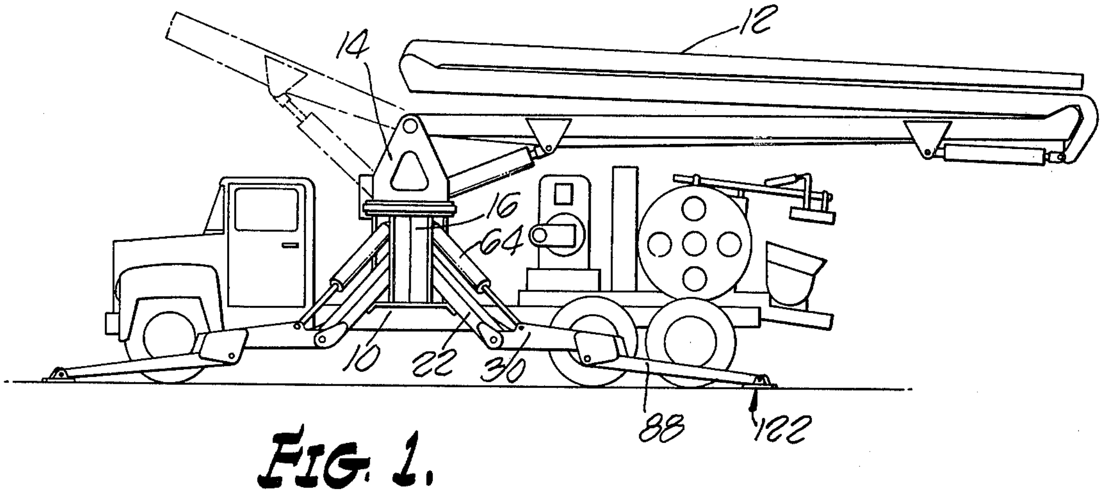
FIG. 1 illustrates a side view of a truck mounted boom incorporating the outrigger system of the present invention.
Figures 2, 3, 6, 7:
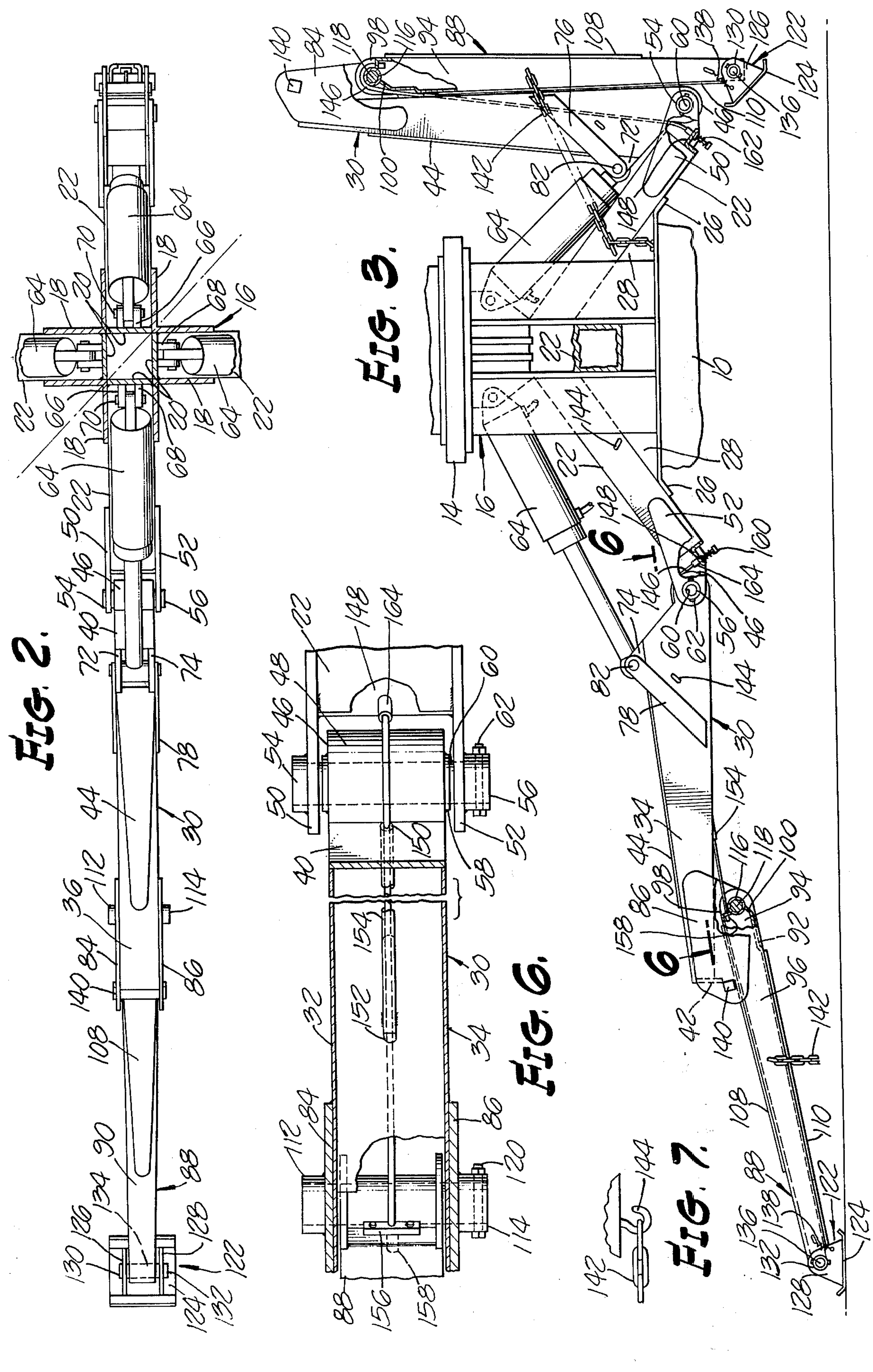
FIG. 2 is a top view of the present invention illustrating a fully extended outrigger.
FIG. 3 is a side view of the present invention illustrating an outrigger fully extended and a second outrigger in the storage position.
FIG. 6 is a cross sectional top view showing the inboard leg member and details of the joints.
FIG. 7 is a detail of the hooks used to attach the chains when the outrigger is in the stowed position or partially deployed.

Turning now to the drawings, FIG. 1 schematically illustrates the present invention with a truck 10 having a concrete pump boom 12. The boom 12 is shown in its stowed position and is shown extended in phantom. The boom 12 is mounted on a turret 14 which is, in turn, fixed to a pedestal 16 which provides a rigid extension of the truck 10. The pedestal 16 is a welded plate structure conveniently made from four angle members 18 having mounting plates 20 welded therebetween to form a solid structure. This pedestal structure is best illustrated in FIG. 2.

Structural mounting extensions 22 are rigidly fixed relative to the truck 10 on the pedestal 16. The structural mounting extensions 22 are positioned between each of the angle members 18 and welded thereto. These extensions 22 are box members which extend outward from the pedestal to a point near the preferred position of the first joint of the respective outriggers. A base plate 24 extends from beneath the pedestal 16 to support the structural mounting extensions 22 and 26. Gussets 28 may be welded in the triangular spaces between the baseplate 24 and the structural mounting extensions 22 for further support thereof. The outrigger assemblies are mounted to these structural mounting extensions 22 which form extensions of the truck body 10 rather than directly to the truck body 10 in order that the entire boom and outrigger assembly may be removed from the truck 10 by separating the baseplate 24 therefrom. Further, the extensions 22 along with the gussets 28 act to further support the pedestal 16 against the bending forces of the concrete pump boom 12. The extensions 22 are each placed at an angle of approximately 45° from the centerline of the truck for proper placement of the outriggers. Thus, a support assembly is provided which is capable of being fixed to the truck for mounting the outriggers.

Each of four substantially identical outriggers includes inboard leg members 30 pivotally mounted to the support assembly at the structural mounting extensions 22. The inboard leg member 30 defines a structural box including side members 32 and 34, a top 36 and a bottom 38. End caps 40 and 42 cover the inner and outer ends respectively. A top reinforcing plate 44 is welded to the top 36 of the leg member 30. Adjacent end cap 40, the leg member 30 extends to a radiused end section 46. A curved cover 48 closes the radiused end section 46.

Mounting brackets 50 and 52 are welded to each structural mounting extension 22 and extend outward to pivotally engage the inboard leg member of each of the outrigger assemblies. Provided through each mounting bracket 50 and 52 are boss members 54 and 56 respectively. A hub 58 is fixed through the inboard leg member 30. A first pin 60 is positioned horizontally through boss members 54 and 56 on the mounting brackets 50 and 52 and through the hub 58 of the inboard leg member 30. The pin 60 is fixed relative to the boss members 54 and 56 by a fastener 62. This pin and hub joint allows the inboard leg member 30 to swing from a vertical position as shown on the right side of FIG. 3 to a position depressed from the horizontal as shown on the left side of FIG. 3. Naturally, the pin and hub joint would allow further rotation of the inboard leg member 30 except for the presence of other components and the ground.

Figure 4:
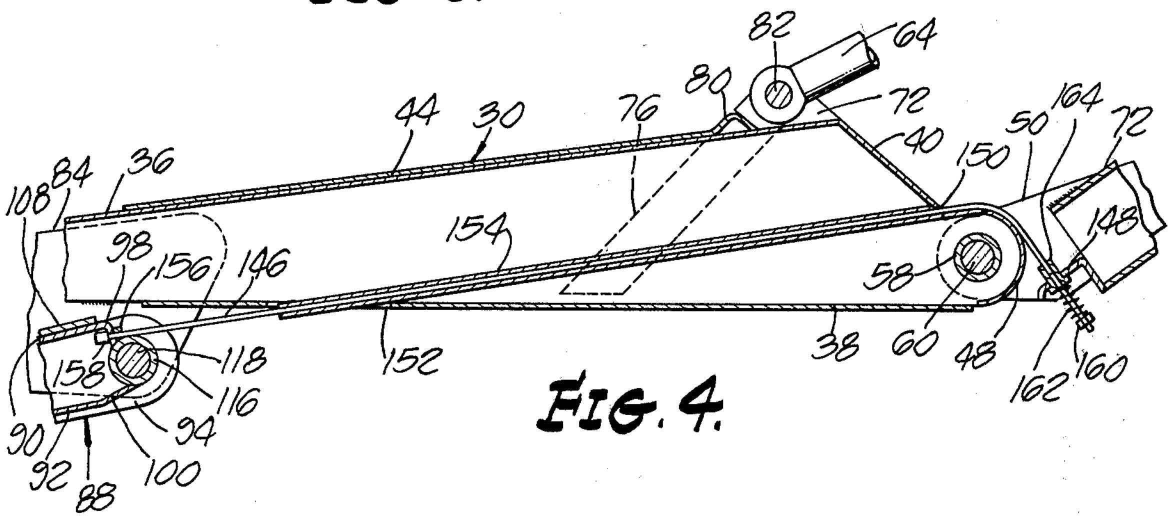
FIG. 4 is a cross sectional view of the inboard leg member and the joints at either end thereof.

Means for pivoting the inboard leg member 30 relative to the truck 10 is provided at the upper end of the leg member 30. This actuating means may comprise a hydraulic cylinder 64 attached at the cylinder end thereof to the pedestal 16 by mounting brackets 66 and 68. The mounting brackets 66 and 68 are welded to the mounting plates 20. The brackets 66 and 68 cooperate with a pin 70 to pivotally fix the cylinder 64 relative to the truck 10. The piston end of the cylinder is pivotally attached to the first leg member 30. Clevis lugs 72 and 74 are welded to the top 36, the reinforcing plate 44 and to stiffeners 76 and 78. The stiffeners 76 and 78 are in turn welded to the sides 32 and 34 of the first leg members 30. The top reinforcing plate 44 has a ridge at 80 as shown in FIG. 4 which abuts the clevis lugs 72 and 74. The lugs 72 and 74 are welded at this ridge 80 of the top reinforcing plate 44. A pin 82 pivotally retains the piston end of the hydraulic cylinder 64 between the clevis lugs 72 and 74. A washer and cotter pin arrangement may be employed to keep the pin 82 in place. At the outboard end of each of the inboard leg members 30, hinge plates 84 and 86 are welded to the sides 32 and 34. For further support, hinge plates 84 and 86 are also welded to the end plate 42. A pin and hub joint is provided at the hinge plates 84 and 86. This second pin and hub joint acts to pivotally join the inboard leg member 30 and an outboard leg member 88.

The outboard leg member 88 also forms a structural box with top 90, bottom 92, and sides 94 and 96. The side members 94 and 96 have inner ends which extend past the top 90 and bottom 92. These ends are circular to avoid interference with the inboard leg member 30. The top 90 extends inward at 98 and the bottom 92 extends inward at 100 before the end of the outboard leg 88. The extensions at 98 and 100 help support the pin and hub joint between the leg members 30 and 88. Also, the bottom is brought inward at 100 to prevent interference with the cable. Reinforcing plates 108 and 110 are welded to the top 90 and bottom 92 respectively. These plates 108 and 110 add rigidity and strength to the outboard leg member 88.

The hub and pin joint between the inboard member 30 and the outboard leg member 88 includes boss members 112 and 114 which are welded into the hinge plates 84 and 86 respectively. A hub 116 is welded into the sides 94 and 96 of the outboard leg member 88. A pin 118 is positioned horizontally through the boss members 112 and 114 and the hub 116 to form the pivot for the pin and hinge joint. The pin 118 is fixed to the boss members 112 and 114 by fastener 120. This outboard pin and hub joint allows the outboard leg member 88 to pivot about a horizontal axis relative to the first leg member 30 in order that the outboard leg member 88 may depend from the first leg member 30 as shown in the right outrigger of FIG. 3 and extend outward at approximately a straight angle from the inboard leg member 30 as shown by the left outrigger in FIG. 3.

Figure 5:
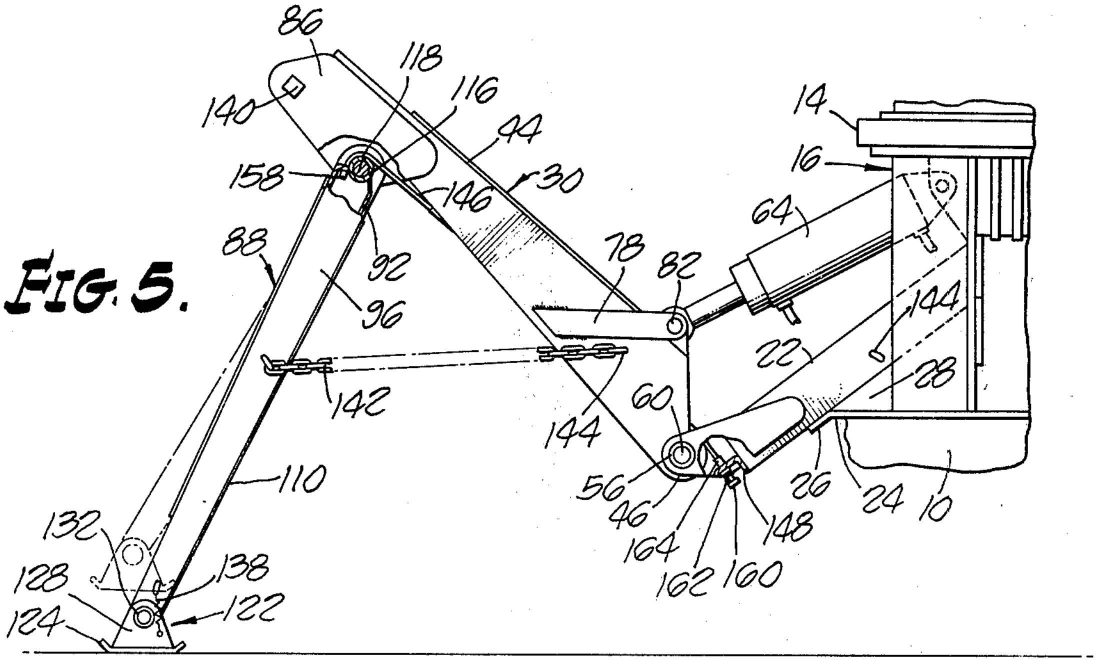
FIG. 5 is a side view of the present invention illustrating the outrigger in a partially extended position.

A foot pad 122 is pivotally mounted at the outboard end of the outboard leg member 88. The foot pad 122 includes a skid pad 124 and foot lugs 126 and 128. The lugs 126 and 128 are welded to the skid pad 124. A hub and pin joint is provided between the foot pad 124 and the outboard leg member 88 which is similar to the joints provided at either end of the inboard leg members 30. Boss members 130 and 132 are positioned in the lugs 126 and 128 respectively. A hub 134 is rigidly welded through the sides 94 and 96 of the outboard leg member 88. A pin 136 is positioned through the boss members 130 and 132 and the hub 134 to form the pivot axis. A fastener is positioned through boss member 132 and pin 136 to fix the pin 136 in the joint. A retainer spring 138 is fixed at one end to the outboard leg member 88 and at the other end to the lug 128 of the foot pad 122. This spring 138 acts to hold the foot pad 122 relative to the outboard leg member 88 in order that the foot pad 122 will tend to properly come to rest on the ground as shown in FIGS. 5 and 7.

Means are provided for preventing the outboard leg member 88 from rotating through more than a predetermined angle with respect to the inboard leg member 30. Retaining means may be provided by a permanent stop 140 fixed through the hinge plates 84 and 86. The end plate 42 of the inboard leg member 30 extends to the stop 140 and is welded thereto. This permanent stop 140 is positioned to prevent the outboard leg member 88 from passing a maximum angle with respect to the inboard leg member 30. In the preferred embodiment, this angle is slightly less than 180 degrees as measured from the stowed position. To provide intermediate stops when a fully extended outrigger is not practical or necessary, a chain 142 is welded to a central position on the side 96 of the outboard leg member 88. This chain 142 may be hooked to the first leg member 30 as shown in FIG. 5 to provide an intermediate positioning of the outrigger. A hook 144 is provided on the first leg member 30 for securing the chain 142. A detail of the hook is shown in FIG. 7. When it is impractical to extend the outrigger even as far as shown in FIG. 5, the chain 142 may be hooked over hook 144 at an intermediate link. If the outrigger must be positioned so close to the truck 10 that the outboard leg member 88 is angled inward toward the truck 10, the chain 142 will not be of any benefit. Consequently, a rigid link capable of supporting compression loads must be employed in place of the chain 142. The chain 142 also acts to lock the outrigger in its stowed position. A hook 114 is provided on the structural mounting extensions 22 for this purpose. The stowed configuration is illustrated in the right side of FIG. 3.

Means are provided for constraining the outboard leg member 88 to pivot about the inboard leg member 30 at a rate which is approximately a fixed multiple of the rate of rotation of the inboard leg member 30 with respect to the truck 10. In this embodiment, the rate of rotation of the outboard leg member 88 is roughly twice that of the inboard leg member 30. To provide this rotation, the constraining means may include a flexible, tension supporting member such as a rope 146 attached at one end to the truck 10 and at the other end to the outboard leg member 88. The rope 146 is preferably of wire for strength and wear advantages. The rope 146 is positioned through the outrigger so that it is directed over the joints at either end of the inboard leg member 30. Specifically, the inboard end of the rope 146 is fixed to the truck 10 at a cable mounting plate 148. The cable mounting plate 148 is welded to the structural mounting extensions 22 and the mounting brackets 50 and 52. The cable mounting plate 148 is positioned to allow the rope to encounter the first joint tangential to the radiused end 146 of the inboard leg member 30. Further, the cable mounting plate 148 is positioned below the radiused end 46 in order that the rope 146 will remain in contact with the end 46 until the first leg member 30 reaches the vertical position as shown on the right outrigger of FIG. 3. The radiused end 46 forms a first circular member which may be presented as shown or form a part of the hub 58. Other combinations which form a circular member of a predetermined radius through an angle which is sufficient to support the rope 146 may be employed. It is preferred that the circular member remain concentric with the pin 60 throughout the rotation of the inboard leg member 30 with respect to the truck 10.

The rope 146 extends through the body of the inboard leg member 30 to the second member 88. The rope 146 enters the structure of the first leg member 30 at a hole 150 through the end cap 40 and comes out through opening 152 in the bottom plate 38 of the inboard leg member 30. A cable guide 154 is positioned about the cable 146 and extends from the opening 150 in the end cap 40 to the opening 152 in the bottom plate 38. The cable guide 154 is fixed to the bottom plate 38 at the opening 154 therein. The rope 146 extends to a cable retainer 156 provided at the end 98 of the top 90 of the outboard leg member 88. A cap 158 is located on the end of the rope after it has been placed through the cable retainer 156. It is most convenient to first assemble the cap 158 to the rope 146 and then bolt the cable retainer 156 to the end 98 of the top 90. A hole is provided through the end 98 which is big enough to allow the cap 158 to be positioned therethrough. The preferred positioning of the end of the cable 146 at cap 158 provides at least tangential contact with the hub 116 when the outboard leg member 88 is at its fully extended position. The hub 116 forms a second circular member for supporting the rope 146 thereby causing the rope 146 to extend around and be spaced from the horizontal pivot axis of the outboard leg member 88 extending through the pin 118. Again, it is preferred that the circular member remain concentric with the pin 118; but the circular member need not be the hub 116 as shown in the preferred embodiment. The circular member could be formed from a second radiused end of the inboard leg member 30.

The radiused end 46 of the first leg member 30 is designed to be approximately twice the diameter of the hub 116. This causes the outboard leg member 88 to rotate relative to the inboard leg member 30 at roughly twice the rate which the inboard leg member 30 rotates relative to the truck 10. This is explained by observing that the rope 146 will be caused to extend about the radiused end 46 of the first leg member 30 a distance which is equal to the radius of the end 146 times the angle in radians from the point where the rope 146 first touches the radiused end 46 until it leaves the curved portion thereof as it nears the hole 150. This angle is approximately zero when the inboard leg members 30 is in its stowed position as shown on the right of FIG. 3. The angle reaches its maximum when the inboard leg member 30 is fully extended. To accommodate this extended distance caused by the rotation of the first leg member 30, the cable is caused to rotate the outboard leg member 88 about the hub 116. By making the radius of the hub 116 over which the rope 146 extends equal to one half the radius of the radiused end 46 of the inboard leg member 30, the angle about which the outboard leg member 88 must pivot must be twice the angle through which the inboard leg member 30 rotates with respect to the truck 10. The exact ratios of the radiuses of the radiused end member 46 to the hub 116 is preferably such that the foot pad 122 will not engage the ground until it is fully extended. Thus, the ratio of these radiuses is dependent on the relative lengths of the inboard leg member 30 and the outboard leg member 88 and the distance from the foot 122 to the ground in the stowed position.

By adjusting the rope 146 and the radiuses of the hub 116 and the radiused end 46 to insure that the foot pad 122 clears the ground during extension, some means is preferably provided so that the foot pad 122 may be forced to the ground where desired for support of the truck 10. One device for accomplishing this function is to provide a spring mounting for one end of the rope 146. Such a device is shown in the drawings as including a cap 160 at the end of the rope 146, a spring 162 and a guide 164. The spring 162 is compressed between the cap 160 and the guide 164. When the outrigger reaches its desired extension, the retaining means, either the chain 142 or the stop 140, prevents further rotation of the outboard leg member 88 and thereby prevents the unwinding of further rope from the hub 116. The cylinder 64 continues to rotate the inboard leg member 30 until the foot 122 reaches the ground. To provide further rope 146 to the radiused end 46 as the inboard leg member 30 rotates downward, the spring 162 is compressed further allowing rope 146 to pass through the guide 164 and over the radiused end 46.

To summarize the overall operation of the support system, the truck 10 is brought into position. An operator unhooks the chains 142 of the various outriggers from the hooks 144. If any of the outriggers are to be only partially deployed, the chain 142 may be hooked at this time to the hook 144 on the inboard leg member 30. The operator may then energize hydraulic cylinders 64 to force each of the inboard leg members 30 to pivot outward from the body of the truck. As each of the inboard leg members 30 is pivoted outward on a horizontal axis, the rope 146 is being extended over the radiused end 46 of the inboard leg member 30. This extending of the rope 146 causes it to tension and provide a torque about the hub 116 of the outboard leg member 88. This torque causes the outboard leg member 88 to rotate in a direction opposite to the rotation of the inboard leg member 30. Because of the ratio of diameters, the outboard leg member 88 rotates relative to the inboard let member 30 at roughly twice the rate at which in inboard let member 30 rotates relative to the truck 10. In the case of an outrigger which has been restrained by the chain 142, the outboard leg member 88 will cease to rotate relative to the inboard leg member 30 when the chain 142 is placed in tension. Because of the flexibility built into the rope 146 at the spring 162, the inboard leg member 30 is allowed to continue pivoting until the foot pad 122 encounters the ground. The unrestricted outriggers continue until the outboard leg members 88 encounter the stop 140 where they too continue to rotate as a unit until the foot pad 122 rests on the ground. The cylinders 64 may be driven further outward to cause a portion of the weight of the truck 10 to rest on the foot pads 122. This shifting of the weight tends to stabilize the unit. The boom may then be actuated.

Thus, a truck boom support system is presented which includes a plurality of outriggers capable of extending by means of pivoted joints to firmly support a truck. The extension of these outriggers may all be accomplished in a single operation which does not involve any sliding members. Also, the actuating cylinders do not experience bending loads during extension or use. Each of the outriggers is mounted on the boom supporting pedestal rather than the truck frame so that all of the forces developed while using the boom are transmitted directly through the pedestal to the outriggers rather than through the truck frame. The outriggers are each at 45° to the truck centerline and extend the same distance in all four directions to uniformly support the pedestal regardless of which direction the boom is extended. In the relatively short-framed truck shown in the drawings the support pads on the outriggers actually extend to or beyond the front and rear wheels of the truck and provide heretofore unattained stability with the truck serving as a counterweight suspended, to a degree, from the boom pedestal. Also, this unitary boom-pedestal-outrigger construction permits mounting thereof on any truck chassis without substantial modification or reinforcing of the chassis. In contrast the heretofore conventional boom and outrigger arrangements require the forces to be transmitted through the truck frame and rely, to some extent, on the support of the truck wheels for stability against overturning.

While embodiments and applications of this invention have been shown and described, it would be apparent to those skilled in the art that many more modifications are possible without departing from the inventive concepts herein described. The invention, therefore, is not to be restricted except as necessary by the prior art and by the spirit of the appended claims.

We claim:

1. A support outrigger for a truck mounted boom comprising a support assembly capable of being fixed to the truck;

a first leg member pivotally mounted to said support assembly about a horizontal axis;

a second leg member pivotally mounted to said first leg member about a horizontal axis;

actuating means for pivoting said first leg member relative to said support assembly;

means for constraining said second leg member to pivot about said first leg member in an opposite direction and at a greater rate than said first leg member when said first leg member pivots about said support assembly, said constraining means including a flexible, tension supporting member fixed at one end to said support assembly and at another end to said second leg member, a first circular member concentrically positioned about the axis of rotation of said first leg member relative to said support assembly and a second circular member positioned concentrically about the axis of rotation of said second leg member relative to said first leg member, said flexible member being extended from said support assembly to said second leg member over said first circular member and said second circular member; and means for preventing said second leg member from pivoting relative to said first leg member through more than a predetermined angle.

2. The outrigger of claim 1 wherein said flexible member includes a rope.

3. The outrigger of claim 1 wherein said flexible member includes means for extending its operative length to allow rotation of said first leg member relative to said support assembly without the rotation of said second leg member relative to said first leg member.

* * * * *